May 22, 1962 R. BLYTHE 3,035,492
ELECTRONIC CONTROL OF OPTICAL AND NEAR OPTICAL RADIATION
Original Filed May 23, 1952
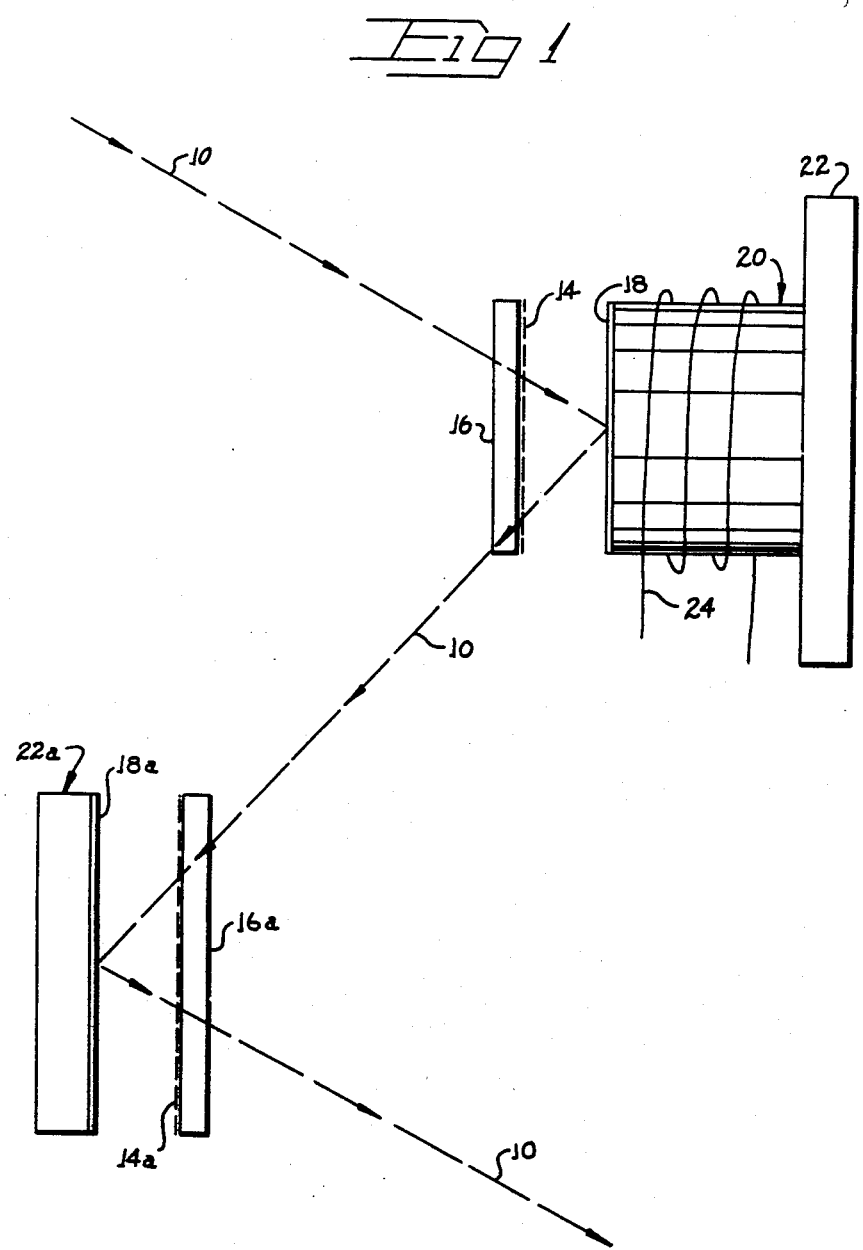
INVENTOR.
RICHARD BLYTHE
BY
WILSON, LEWIS & McRAE

United States Patent Office 3,035,492
Patented May 22, 1962

---

3,035,492
ELECTRONIC CONTROL OF OPTICAL AND NEAR OPTICAL RADIATION
Richard Blythe, 3555 N. Dixboro Road,
Ann Arbor Township, Mich.
Original application May 23, 1952, Ser. No. 289,693, now Patent No. 2,920,529, dated Jan. 12, 1960. Divided and this application May 15, 1959, Ser. No. 813,450
6 Claims. (Cl. 88—61)

The present invention relates to apparatus for controlling optical interference filters by electrostrictive and magnetostrictive methods.

The present application is a division of my co-pending application Serial No. 289,693, filed May 23, 1952, now Patent No. 2,920,529, issued January 12, 1960.

For purposes of the present application, the term "light rays" is used in a generic sense to include primarily the optical and near-optical radiations of the electro-magnetic spectrum. However, the present invention is not thereby to be expressly limited to uses within such radiation ranges since rays within the invisible spectra may also be controlled by the present invention.

The word "strictive" as used herein is a generic term which embodies the terms "magnetostrictive" and "electrostrictive."

The term "optical interference filter" as used herein is to be taken as also including interferometers since, as well know in the art, the distinction between interference "filter" and "interferometer" is a matter of degree and use only and the present invention is equally applicable to both interference filters and interferometers.

It is broadly an object of the present invention to provide a method for controlling light rays which includes subjecting such light rays to a control element which is affixed to a strictive element and subjecting the strictive element to an energy field so that said strictive element varies its position in accordance with the energy field, the control element being moved accordingly to vary the control of the light rays.

It is another object of the present invention to provide a device for controlling light rays which includes a strictive element coupled to a source of electrical energy and a control element affixed to said strictive element, the light rays engaging said control element being regulated by the position of the strictive element as determined by the source of electrical energy.

It is a further object of the present invention to provide a method for controlling an optical interference filter and a device for carrying out the said method, which includes passing light rays through a semi-transparent medium to a reflecting surface and back through the semi-transparent medium and varying the position of the reflecting surface in respect to the semi-transparent medium by subjecting a strictive element, which is affixed to the reflecting surface, to a field of energy. Thus, the position of the reflecting surface is varied in accordance with the movement of the strictive element which movement is controlled by the field of energy.

Other objects of this invention will appear in the following description and appended claims, reference being had to the accompanying drawings forming a part of this specification wherein like reference characters designate corresponding parts in the several views.

The features of this invention which are believed to be novel and patentable will be pointed out in the claims appended hereto. For a better understanding of this invention, reference is made in the following description to the accompanying drawings.

In the drawings:

FIG. 1 is a schematic view of a reflection type optical interference filter system embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIG. 1 represents a schematic diagram of a reflection-type optical interference filter, valve, or shutter system. Light ray 10 passes through a semi-transparent film 14 having the proper pre-determined optical characteristics. This film is on a transparent backing plate 16. The light is reflected from a mirror surface 18 on the end of a magnetostrictive element 20 and back out through elements 14 and 16. Magnetostrictive element 20 is such that when it is subjected to a magnetic field its length changes thereby moving the mirror surface 18 on the end thereof toward and away from the semi-transparent film 14. This change in the distance between the mirror surface and the semi-transparent film causes rays of different optical frequency or order to be reflected back through the semi-transparent film.

Magnetostrictive element 20 is mounted on a fixed base 22 and is subject to the magnetic field produced when current passes through a coil 24 that surrounds the magnetostrictive element. A change in the current passing through coil 24 produces a corresponding change in the dimension of magnetostrictive element 20 thereby changing the position of mirror surface 18 with respect to semi-transparent film 14. As explained hereinbefore, this change in distance between the mirror surface 18 and the semi-transparent film 14 changes the frequency or order of the light rays which will be passed. Thus, the selection of those light rays which will be passed by the device is determined by current flow through coil 24.

If this unit is to be used as an optical shutter, a second reflection-type optical interference filter of predetermined fixed characteristic is placed in the system such that light ray 10 reflected from the variable filter will pass through backing plate 16a, semi-transparent film 14a, and be reflected from mirror 18a on mount 22a back through 14a and 16a. If the two filters are set to pass light rays of the same frequency or proper multiples thereof, ray 10 will pass out of the system. But, if current in coil 24 causes the variable filter to vary from this condition, then the ray 10 will not pass through the fixed filter.

It will be appreciated that the variable reflection-type interference filter can be used alone as a control element and that the present invention also comprehends including the fixed filter with the variable filter whereby the combined filters will function as a control device.

The selection of the particular type of magnetostrictive material for element 20 and the particular type of electronic circuitry to give the desired optical results can be readily made by those skilled in the art by mathematical techniques or slight experimentation.

In general, magnetostrictive elements have electrostrictive analogs and vice versa, and the discussions herein are not intended to be limited to either individual case.

It is possible to use the principles embodied in this invention for a great diversity of purposes. A brief survey of these uses follows, but it is not intended that this list should be a limitation on this invention. Some uses are:

Advertising, color control, automatic color matching, color placement, pyrometers, automatic pattern following, data sensing, automatic spectrophotometry, metrology, telemetering, automatic sorting and counting, information seekers, computation devices, comparison mechanisms, display devices, meters, alignment mechanisms, weighing devices, signalling devices, high speed shutters, scanning devices, general control devices, image devices, television transmitting and receiving aids, frequency changing and wave form producing devices, and many more.

It is understood that the different properties and characteristics of the material used for the magnetostrictive or electrostrictive elements will vary over a wide range and that the specific properties of any chosen element can be determined experimentally. In forming the strictive element, the hysteresis, temperature coefficient, and frequency resonance characteristics must be considered. Once these properties have been determined for a particular element, the control of the system using any such strictive element can be effected by those skilled in the art to assure the desired repetitive functions of the strictive element. Methods and devices for effecting such control may include among other controls, varying the applied wave form pattern or frequency, the use of temperature control devices for maintaining a temperature within a pre-selected range, mechanical or other adjustments of the elements to compensate for temperature variations, impedance control devices, damping control devices, or the like.

Having thus described my invention, I claim:

1. A reflection-type optical interference filter comprising; a magnetostrictive element having a reflecting surface thereon, said magnetostrictive element being coupled with a source of electrical energy, and a partially transmitting, partially reflecting film disposed in front of said reflecting surface at a distance to produce predetermined optical band pass and free spectral range, the light rays passing through the device being controlled by the distance between said reflecting surface and said film which distance is in turn controlled by the position of said magnetostrictive element as determined by the said source of electrical energy.

2. A reflection-type optical interference filter as claimed in claim 1 and further characterized in that said reflecting surface is disposed on one end of said magnetostrictive element, said magnetostrictive element is affixed at its opposite end to a rigid base with the portions between the ends free, and the distance between the said ends of said magnetostrictive element varies in accordance with variations in the said source of electrical energy.

3. A reflection-type optical interference filter comprising; an elongated magnetostrictive element affixed at one end to a rigid base, a coil wound on said magnetostrictive element and connected to a source of electrical energy, a mirror mounted on the free end of said magnetostrictive element, and a partially transmitting, partially reflecting film of pre-determined optical characteristics disposed in front of said mirror and spaced therefrom at a distance to produce a predetermined optical band pass and free spectral range, said magnetostrictive element varying in length in response to variations in said electrical source thereby varying the distance between said mirror and said film to control light rays passing in through said film to said mirror and back out through said film.

4. An optical control system comprising: a variable reflection-type optical interference filter comprising a magnetostrictive element with a reflecting surface thereon, a film of partially transmitting, partially reflecting material disposed in front of said reflecting surface, and a source of electrical energy coupled with said magnetostrictive element whereby the distance between said reflecting surface and the said film is controlled by said source of electrical energy through changes in the position of said magnetostrictive element thereby controlling the light rays which will pass through said variable filter; and a fixed reflection-type optical interference filter disposed in the path of light rays passing out of the said variable filter and comprising a reflecting surface and a partially transmitting, partially reflecting film disposed in front of said reflecting surface at a pre-determined fixed distance therefrom whereby light rays passing out of the said variable filter pass through said fixed filter only when the two filters are set to pass light rays of the same frequency and proper multiples thereof.

5. An optical control system as claimed in claim 4 and further characterized in that the first mentioned reflecting surface is disposed on one end of said mangetostrictive element, said magnetostrictive element is affixed at its opposite end to a rigid base, and the distance between the said ends of said magnetostrictive element varies in accordance with variations in the said source of electrical energy.

6. An optical control system comprising: a variable reflection-type optical interference filter comprising an elongated magnetostrictive element affixed at one end to a rigid base, a coil wound on said magnetostrictive element and connected to a source of electrical energy, a mirror mounted on the free end of said magnetostrictive element, and a partially transmitting, partially reflecting film of pre-determined optical characteristics disposed in front of said mirror and spaced therefrom, said magnetostrictive element varying in length in response to variations in said electrical source thereby varying the distance between said mirror and said film to control the light rays passing in through said film to said mirror and back out through said film, and; a fixed reflection-type optical interference filter disposed in the path of light rays passing out of the said variable filter and comprising a reflecting surface and a partially transmitting partially reflecting film of pre-determind optical characteristics disposed in front of said reflecting surface at a pre-determined fixed distance therefrom whereby light rays passing out of the said variable filter pass through said fixed filter only when the two filters are set to pass light rays of the same frequency and proper multiples thereof.

References Cited in the file of this patent

UNITED STATES PATENTS

| | | |
|---|---|---|
| 1,951,523 | Nicolson | Mar. 20, 1934 |
| 2,363,409 | Gibson | Nov. 21, 1944 |
| 2,455,763 | Harrison | Dec. 7, 1948 |
| 2,534,846 | Ambrose et al. | Dec. 19, 1950 |